Dec. 2, 1952 C. C. POND 2,620,404

DRIVING AND SCANNING MECHANISM FOR MAGNETIC TAPE HANDLING EQUIPMENT

Filed July 7, 1949 2 SHEETS—SHEET 1

INVENTOR
Chester C. Pond
BY
Symmes, Wead & Lechner
ATTORNEYS

INVENTOR
Chester C. Pond
BY
ATTORNEY

Patented Dec. 2, 1952

2,620,404

UNITED STATES PATENT OFFICE 2,620,404

DRIVING AND SCANNING MECHANISM FOR MAGNETIC TAPE HANDLING EQUIPMENT

Chester C. Pond, Melrose Park, Pa., assignor to The International Electronics Company, Philadelphia, Pa., a corporation of Pennsylvania Application July 7, 1949, Serial No. 103,352

6 Claims. (Cl. 179—100.2)

This invention relates to equipment for use with magnetic tape records and the invention is especially concerned with certain features of the tape drive mechanism and the tape scanning mechanism and with controls for coordinating the operation of these mechanisms.

A machine of the character to which the invention is especially directed is shown in the copending application of Frank J. Reed and Lloyd J. Bobb, Serial No. 101,053, filed June 24, 1949. In general, such a machine comprises a pair of reels between which a tape record is adapted to be fed. A driving capstan is arranged to drivingly engage the tape in the path of feed between the reels and both the reels and the capstan are advantageously arranged for reversible drive, so that the tape may be fed in either direction. A further feature of a machine of the general character referred to is the provision of a shiftably mounted magnetic scanning device or recording-playback head which is selectively registerable with side-by-side tracks on a tape, provision being made for recording or playing one track in one direction and another track in the reverse direction, so that upon completion of both tracks, the tape record is rewound and ready for reuse.

A machine of the above type also includes reel drive mechanism providing for selective drive of either reel, so that the tape may be taken up on either reel as it is fed thereto by the driving capstan. In the system, as described, where side-by-side tracks are utilized on the tape, the recording head is adjustably shifted from one track to the other concurrently with adjustment of the reel drive to effect the take-up drive of one reel or the other.

Briefly described, the invention is concerned with means interlocking the operation of the reel drive mechanism and the shifting of the recording head. According to the invention both of these functions are performed by a single actuating element and provision is made for adjusting the relationships of the parts, so that the movements of both the recording head and of the selective reel drive may be properly coordinated with respect to the movements of said common actuating element.

It is also an object of the invention to provide simple and accurate adjustability of the recording head, both with respect to the extent of shifting movement thereof and also with respect to the mean position of the head with relation to the tape.

A further object of the invention is the provision of a novel selective reel drive mechanism arranged not only to ensure positive action but also to minimize tendencies to chatter or introduce other undesirable oscillations or vibrations.

How the foregoing and other objects and advantages are attained will appear more fully from the accompanying description referring to the accompanying drawings, in which—

Figure 1:
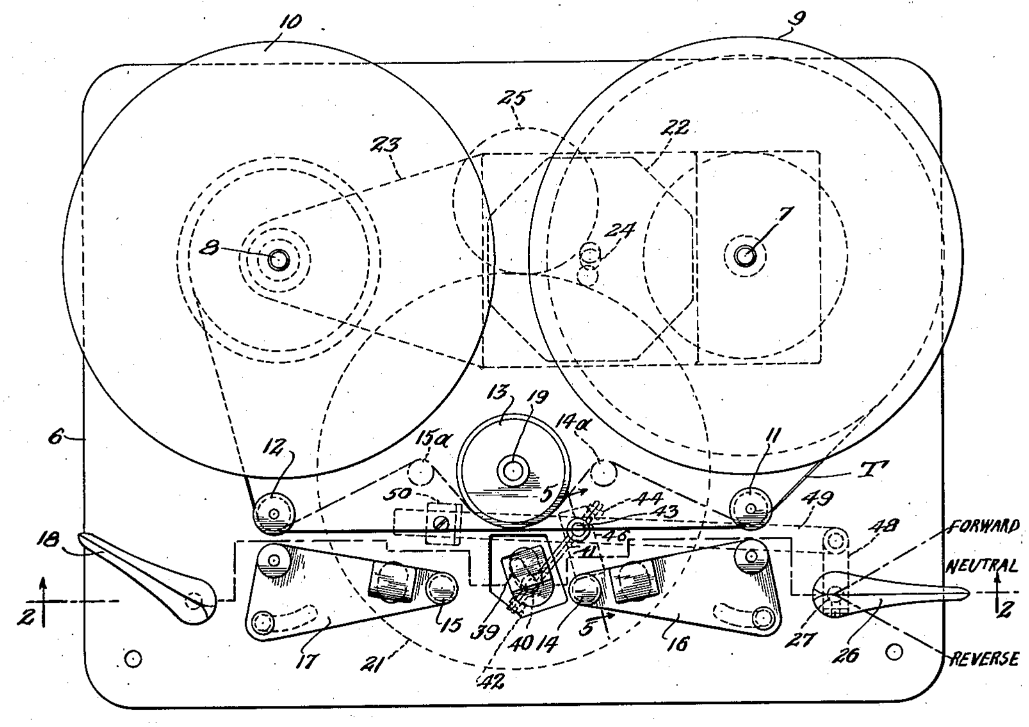
Figure 1 is a top plan view of a machine constructed according to the present invention, certain parts being shown merely in outline for the sake of simplicity.

The machine shown in Figure 1 is built up on a mounting plate 6 and incorporates a pair of reel spindles 7 and 8 adapted respectively to mount the reels 9 and 10. The tape T is adapted to be fed between the reels, the said path being defined in part by a pair of guide posts 11 and 12. The tape driving capstan 13 is arranged to drivingly engage the tape in the path of feed between the guide posts 11 and 12.

The tape may be retained in driving engagement with the capstan 13 by means of a pair of shiftably movable guide elements 14 and 15 which are carried respectively on pivoted arms 16 and 17. These arms are arranged to be moved by the control lever 18 between the full-line position shown in Figure 1 and the dotted-line positions of the guide elements 14 and 15 which are shown in this same figure at 14a and 15a. The control mechanism for effecting movement of these guide elements and of the arms 16 and 17 forms no part of the present invention per se and therefore need not be considered in detail herein. It may be mentioned, however, that a full disclosure of these parts appears in the copending application above referred to. The tape may readily be threaded in the machine when the arms 16 and 17 are moved outwardly to the full-line position of Figure 1, but accuracy of drive of the tape by the capstan 13 is maintained when the guide elements 14 and 15 occupy the inner positions.

Figure 3:
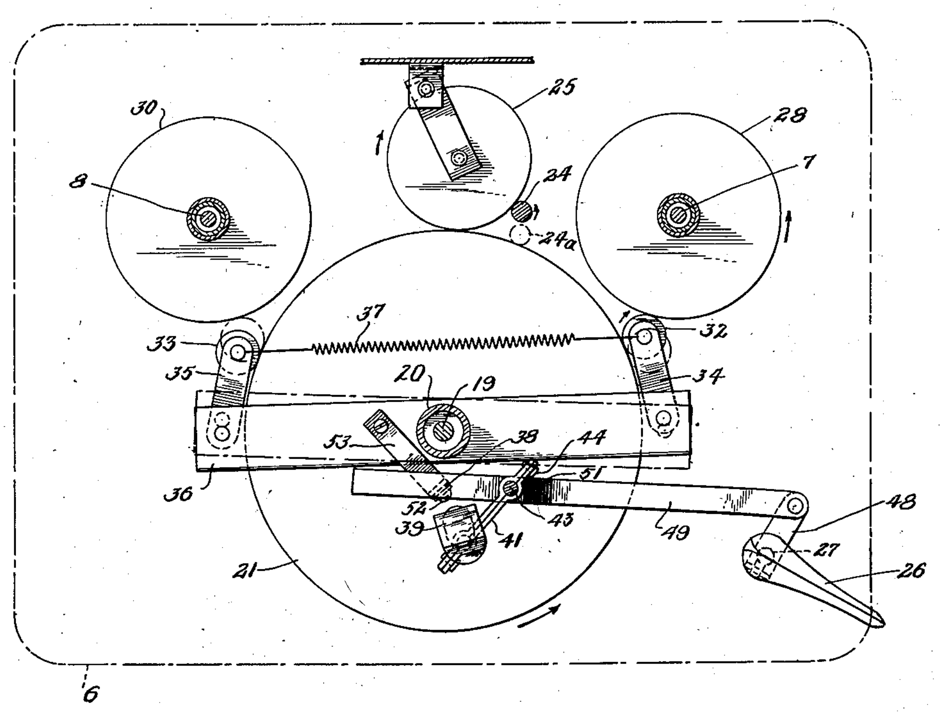
Figure 3 is a plan section of certain of the drive and scanning mechanisms.

The capstan is mounted on a shaft 19 journaled in a housing 20 suspended from the base board 6 of the machine and at its lower end the shaft 19 carries a capstan driving wheel 21. The capstan driving wheel 21 is adapted to be driven by the motor indicated at 22. The motor is shiftably mounted by means of bracket supports 23 which are journaled for oscillation and rotation about the axis of reel spindle 8. The motor shaft 24 is adapted in one position to be directly engaged with the capstan driving wheel 21, as indicated at 24a in Figure 3; and in the other position the motor shaft is adapted to drive the capstan driving wheel through the pivotally mounted idler wheel 25. The motor is adapted to be shifted from one position to the other by means of the reversing control lever 26 mounted on the reversing control shaft 27, the linkage providing for the shift of the motor forming no part of the present invention per se but being described in the copending application above referred to and also in the copending application of Burnham E. Stone, Serial No. 19,913, filed April 9, 1948, and assigned to the assignee of the present application.

The reels are adapted to be selectively driven so as to take up the tape thereon, depending upon the direction of drive of the capstan 13. For this purpose the reel shaft 7 has a driving wheel 28 mounted thereon and connected with the shaft 7 through a slip clutch 29. Similar parts identified by the numerals 30 and 31 are provided for the reel spindle 8. The two wheels 28 and 30 are shown in outline in Figure 3 and from this view it will be seen that these wheels are adapted to be driven from the capstan driving wheel 21 by means of rollers 32 and 33. These rollers are mounted on arms 34 and 35 which are pivoted to the oscillatable beam 36, the beam in turn being journaled for oscillative movement about the axis of the capstan driving shaft 19. The two arms and thus the rollers 32 and 33 carried thereby are yieldingly urged toward each other by means of a spring 37. When the beam 36 is oscillated in one direction the roller 32 interengages the wheels 21 and 28, the roller 33 being at this time disengaged from the wheel 30. In the other position of oscillation of the beam 36 the roller 33 interengages wheels 21 and 30 the roller 32 being disengaged at this time. The beam 36 is biased to one position or another by means of a bias spring 38 best seen in Figure 4 and described hereinafter in connection with that figure.

At this point attention is called to the arrangement of the magnetic recording-playback head 39. This head is carried by a post 40 with which a pair of straps 41 cooperate, the straps being clamped to the post as by means of a screw 42 and therefore being adjustable vertically with respect to the post 40. The other ends of the straps 41 are also clamped to a pivot pin 43 as by a screw 44. The pivot pin 43 is mounted in a pair of sleeves 45 and 45a carried by a bracket 46 depending from the base plate 6 of the machine.

A spring 47 surrounding the pivot pin 43 and connected to the sleeve 45 and to the brackets 41 serves to yieldingly urge the pivot pin and thus the recording head downwardly and serves further to apply a bias to the brackets 41 tending to move the recording head toward the capstan 13, to engage the tape thereon. Means are also provided for displacing the recording head away from the capstan, for instance to the full-line position shown in Figures 1 and 3. Such means need not be considered herein since they form no part of the present invention per se, but it is mentioned that an arrangement for this purpose is fully disclosed in the copending application of Frank J. Reed and Lloyd J. Bobb hereinabove identified. It may be briefly mentioned that the control for displacing the recording head away from the capstan is connected with the control lever 18 which also moves the tape threading arms 16 and 17 between their inner and outer positions. When the tape threading arms are moved to the outer position the recording head is displaced against the action of spring 47 above referred to.

Figure 4:
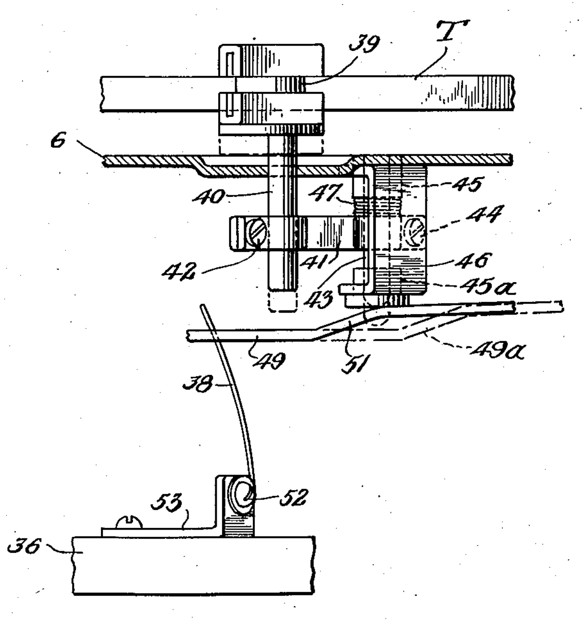
Figure 4 is an enlarged view of the interlocking control mechanism for the movements of the recording head and for adjustment of the selective reel drive.
Figure 5:
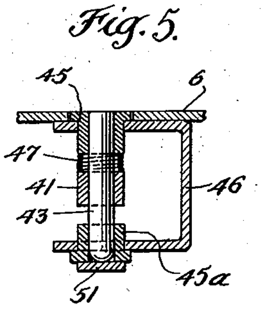
Figure 5 is a vertical sectional view of certain details, this view being shown on the scale of Figure 4 but being taken as indicated by the section line 5—5 on Figure 1.

Because of the mounting of the recording head described and also shown in Figures 4 and 5, the recording head is not only pivotally movable toward and away from the capstan but is further vertically shiftable so as to bring the pole pieces of the head into registry with different tracks on the tape. It is contemplated that this shifting be utilized for recording or playing back first one track toward one edge of the tape, running in one direction, and then another track, toward the other edge of the tape, running in the opposite direction.

Figure 2:
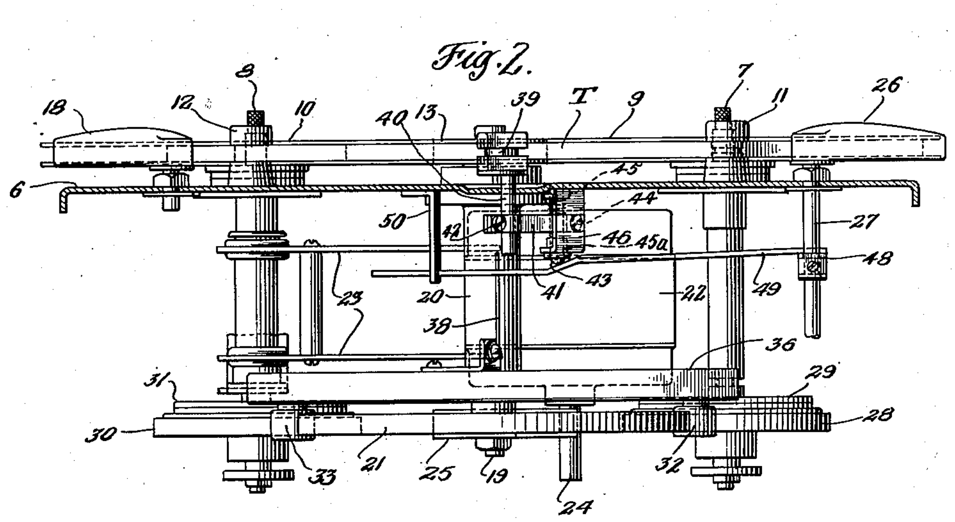
Figure 2 is a view taken substantially as indicated by the line 2—2 on Figure 1.

One of the important features of this invention is the arrangement of parts for controlling the movement of the idler beam 36 and for controlling the shifting movement of the recording head 39. For the purpose just mentioned the reversing control shaft 27 carries an arm 48 to which is connected the push-pull member 49 supported at its free end in a slot formed in the depending bracket 50 (see Figure 2). This member 49 has an inclined or camming portion 51 adapted to engage the lower projecting end of the pivot pin 43 so as to raise this pivot pin when the member 49 is moved toward the left when viewed as in Figure 4 and so as to permit lowering of the pin under the action of spring 47 when the member 49 is moved to the right.

From examination of Figure 4 it will further be seen that this same reciprocatory movement of the member 49 serves to deflect the spring finger 38 which biases the idler beam 36 in one direction or the other. This spring finger is advantageously fastened by means of a screw 52, to a bracket 53 connnected with the beam 36. The arrangement of the spring finger 38 and the adjustable parts 52 and 53 provides for exceedingly simple and yet positive adjustment of the biasing action of the spring finger 38. This is an important factor in eliminating tendency for the idler beam 36 and also for the rollers 32 and 33 to chatter. Smoothness of operation of these driving parts is of advantage since equipment of this character is highly sensitive to variations or fluctuations in driving speed of the tape, the consequence of such variations being introduction of "wow" as is well known.

The arrangement of the mounting parts for the recording head 39 provides an exceedingly simple and convenient system for making initial settings of the position of the head with relation to the tape. In the first place the screw 42 and the clamping brackets 41 comprise an exceedingly simple adjustment by means of which the angular position of the head 39 may be regulated and further by means of which the overall or average vertical position of the head may be adjusted. The extent of vertical throw of the head when shifted from one track to another can readily be set with the use of a gauge or the like, for instance a gauge bridging the space between the upper edge of the sleeve 45 and the lowermost position of the bottom end of the pin 43 desired. The selected or adjusted relative positions of the pin and of the brackets may conveniently be fixed by means of the fastening screw 44.

Because of the arrangements described above, the sleeve or collar 45 serves as the means determining the extent of vertical throw of the recording head when shifting from one track to another. When moving in the downward direction, the downward movement is limited by engagement of the bracket elements 41—41 with the upper end of the collar 45*a*. Movement in the upward direction is limited by engagement of the lifting cam 51 with the lower surface of the collar 45*a*. Accuracy of throw from one track to the other is thereby ensured. It is also noted that when the member 49 is moved toward the right when viewed as in Figure 4, for instance to the dotted-line showing at 49*a*, the lower end of the pin 43 is out of engagement with the member 49, so as to ensure that the lower position of the head will be determined by engagement of the bracket members 41 with the upper end of the collar 45*a*.

According to the foregoing provision is made for simple and yet accurate adjustments of both the recording head and of the biasing action on the idler beam 36. At the same time, the shifting movements of the recording head and of the idler beam 36 are controlled in common by a single very simple control element, i. e., the push-pull member 49, which is connected with an arm mounted on the main reversing shaft 27.

It will be understood that a machine of the general character described above would include parts in addition to those already discussed. However, a number of such parts have been omitted from the disclosure herein for the sake of clarity but for further details reference may be had to the copending application of Frank J. Reed and Lloyd J. Bobb identified above.

I claim:

1. Equipment for use with magnetic tape records comprising in combination with a pair of reels between which a tape is adapted to be fed, a tape driving capstan adapted to engage a tape in the path of feed between the reels, reel drive mechanism adapted alternatively to drive one reel or the other, a magnetic scanning device with a mount therefor shiftable with respect to the tape to position the head to register with different side-by-side tracks on the tape, and mechanism coordinating adjustment of the reel drive with shifting movement of the scanning device comprising a push-pull member carrying a cam surface engaging the mount for the scanning device for shifting the scanning device and an operating connection extended to the reel drive mechanism.

2. Equipment for use with magnetic tape records comprising in combination with a pair of reels between which a tape is adapted to be fed, a magnetic scanning device shiftable with respect to the tape, reel drive mechanism comprising an oscillatable beam carrying drive elements adapted in one position of the beam to effect drive of one of the reels and in the other position of the beam to effect drive of the other reel, and mechanism for coordinating adjustment of the reel drive and shifting movement of the scanning device, comprising a manually operable member having a cam surface adapted to shift the scanning device, and a spring finger interconnecting said member and said beam.

3. In equipment for use with magnetic tape records, a scanning device arranged for shifting movement to scan different tracks on a tape, a post for supporting said device, a bracket projecting laterally from said post and connected therewith, the bracket and post being relatively adjustable to different fixed positions along the axis of the post, and a pivot connected with the bracket and mounted for vertical shifting movement and further providing an axis for swinging movement of the bracket and of the scanning device, the pivot and bracket being relatively adjustable to different fixed positions along the axis of the pivot.

4. A construction according to claim 3 and further including a bearing collar for said pivot associated with the pivot so that in one axial position of the pivot the pivot projects beyond one end of the bearing collar and in another position the end of the pivot lies flush with said end of the collar, and a yielding cam element shiftable across said end of the collar to effect axial shifting movement of said pivot.

5. A magnetic scanning head mounting and adjustment mechanism comprising a pivot pin on which the scanning head is mounted, an adjustment device providing for adjustment of the position of the scanning head to different positions axially of the pivot pin, a collar in which said pivot pin is axially shiftable between one position in which the pin projects from one end of the collar and another position in which the end of the pin lies flush with said end of the collar, and a cam element movable across said end of the collar and providing for shifting of the pivot pin between said positions.

6. A construction according to claim 5 and further including an adjustable stop device on the pivot pin adapted to engage the opposite end of said collar to limit the extent of axial movement of the pin in one direction.

CHESTER C. POND.

REFERENCES CITED

The following references are of record in the file of this patent:

UNITED STATES PATENTS

| Number | Name | Date |
|---|---|---|
| 2,032,190 | Thomas | Feb. 25, 1936 |
| 2,275,961 | Heller | Mar. 10, 1942 |
| 2,349,018 | Tasker | May 16, 1944 |
| 2,365,691 | Fodor | Dec. 26, 1944 |
| 2,369,017 | Camras | Feb. 6, 1945 |
| 2,408,320 | Kuhlick | Sept. 24, 1946 |
| 2,418,543 | Camras | Apr. 8, 1947 |
| 2,468,198 | Heller | Apr. 26, 1949 |